United States Patent
Frick et al.

(10) Patent No.: US 6,439,011 B1
(45) Date of Patent: Aug. 27, 2002

(54) DEVICE FOR LOCKING THE STEERING SPINDLE OF A VEHICLE

(75) Inventors: Alexander Frick, Augsburg; Mario Pieh, Marktbreit; Etienne Rocheteau, Grossberghofen; Harald Starken, Walkertshofen; Kurt Lieb, Seligenstadt, all of (DE)

(73) Assignee: Valeo Deutschland GmbH & Co. Sicherheitssysteme, Erdweg (DE)

( * ) Notice: Subject to any disclaimer, the term of this patent is extended or adjusted under 35 U.S.C. 154(b) by 0 days.

(21) Appl. No.: 09/938,673

(22) Filed: Aug. 27, 2001

(30) Foreign Application Priority Data

Aug. 26, 2000 (DE) .......................... 100 41 984

(51) Int. Cl.$^7$ ............................... B60R 25/02
(52) U.S. Cl. ............... 70/185; 70/186; 70/252
(58) Field of Search ............... 70/181–189, 252

(56) References Cited

U.S. PATENT DOCUMENTS

| | | | | |
|---|---|---|---|---|
| 3,914,967 A | * | 10/1975 | Arman | 70/252 |
| 4,414,830 A | * | 11/1983 | Maiocco | 70/252 |
| 4,647,229 A | * | 3/1987 | Melugin | 70/186 X |
| 4,784,415 A | | 11/1988 | Malaval | 292/144 |
| 5,595,079 A | * | 1/1997 | Myers | 70/185 X |
| 5,794,469 A | * | 8/1998 | Suzuki | 70/252 |
| 5,896,765 A | * | 4/1999 | Peyre et al. | 70/186 |
| 6,035,675 A | * | 3/2000 | Zimmer et al. | 70/186 |
| 6,125,671 A | * | 10/2000 | Suzuki | 70/186 |
| 6,237,378 B1 | * | 5/2001 | Canrad | 70/252 |
| 6,295,848 B1 | * | 10/2001 | Suzuki | 70/186 |
| 6,298,938 B1 | * | 10/2001 | Klaiber et al. | 70/186 X |
| 6,327,882 B1 | * | 12/2001 | Canard | 70/186 |
| 6,349,579 B1 | * | 2/2002 | Canard | 70/186 |
| 6,354,117 B1 | * | 3/2002 | Canard | 70/186 |
| 6,354,118 B1 | * | 3/2002 | Frick et al. | 70/186 |

FOREIGN PATENT DOCUMENTS

| | | |
|---|---|---|
| DE | 44 46 613 A1 | 6/1996 |
| DE | 197 04 062 C2 | 8/1998 |
| EP | 0 953 487 A1 | 11/1999 |
| EP | 0 995 648 A1 | 4/2000 |

\* cited by examiner

*Primary Examiner*—Suzanne Dino Barrett
(74) *Attorney, Agent, or Firm*—Liniak, Berenato, Longacre & White

(57) ABSTRACT

A device (1) for locking the steering spindle (2) of a steering gear of a vehicle, having a blocking pin (6) which is arranged in a housing (3) and can be displaced from a release position into a locking position and vice versa. In order to prevent manipulation of the device (1) by an unauthorized third party if the housing (3) of the device (1) has been forcibly opened and the blocking pin (6) is located in its locking position, a spring-actuated securing element (17; 17') is arranged in a guide part (12; 12') of the blocking pin (6), said securing element being fixed in its position by a closure element (20) which is fastened on the inside of the housing (3). If the housing (3) is opened by an unauthorized third party, then the closure element (20) is also removed together with the corresponding housing region and the securing element (17; 17') is at least partially displaced into a recess (21) of the blocking pin (6) and secures the latter in its locking position.

8 Claims, 3 Drawing Sheets

DEVICE FOR LOCKING THE STEERING SPINDLE OF A VEHICLE

The invention relates to a device for locking the steering spindle of a steering gear of a vehicle, having a blocking pin which is arranged in a housing and can be displaced from a release position into a locking position and vice versa.

A device of this type is disclosed, for example, in DE 197 13 318 C1. In the case of this known device, the housing of the device is composed of two housing parts surrounding the casing tube of the steering spindle, the one housing part being connected nonreleasably to the casing tube and the second housing part being connected releasably to the first housing part. In order to avoid it being possible, in the locking position of the blocking pin, for an unauthorized third party to open the second housing part, for example by releasing screws etc., and then pushing the blocking pin out of its locking position, DE 197 13 318 C1 proposes the use of an additional securing pin. The latter is activated by the blocking pin in such a manner that in the locking position of the blocking pin, said securing pin connects the second housing half to the first housing half from the housing interior (cannot be seen from the outside).

Among the disadvantages of this known device is that after a forcible opening of the housing, for example using appropriate special tools, an unauthorized third party can displace the blocking pin again from its locking position into its release position.

The invention is based on the object of specifying a device of the type mentioned at the beginning in which manipulation of the blocking pin is also prevented when the housing of the device has been forcibly opened and the blocking pin is in its locking position. to the invention, this object is achieved by the features of claim 1. Further, particularly advantageous refinements of the invention are disclosed by the subclaims.

The invention is essentially based on the concept of arranging a spring-actuated securing element in as guide part of the blocking pin, said securing element being fixed in its position by a closure element which is fastened on the inside of the housing. If the housing is opened by an unauthorized third party, then the closure element is also removed together with the corresponding housing region and the securing element is at least partially displaced into a recess of the blocking pin and secures the latter in its locking position.

The securing element used may be either a pin (securing pin), which is actuated by a spring, or a leg spring, in which case the leg facing the closure element takes over the function of the securing element.

In one advantageous embodiment of the invention, the recess of the blocking pin is arranged on the edge thereof and is configured in such a manner that in the locking position of the blocking pin once the housing part is removed, the blocking pin is secured by clamping. Such an arrangement of the recess of the blocking pin has the advantage that the recess can easily be made in the blocking pin and the pin is only slightly weakened by the recess.

The closure element is preferably arranged in the housing region from which it has to be assumed that an unauthorized third party will forcibly open the housing in this region. This will generally be the region facing the interior of the vehicle. It is also conceivable to configure the outside of the corresponding housing region in such a manner that the configuration will cause an unauthorized third party to have to attach his tools to this region in order to open the housing.

It is furthermore advantageous if it cannot be seen from the outside where exactly the securing element is located on the guide part of the blocking pin, with the result that an unauthorized person cannot remove the securing part by drilling open the guide part and then displace the blocking pin.

Further details and advantages of the invention emerge from the following exemplary embodiments explained with reference to the figures, in which.

Figure 1:
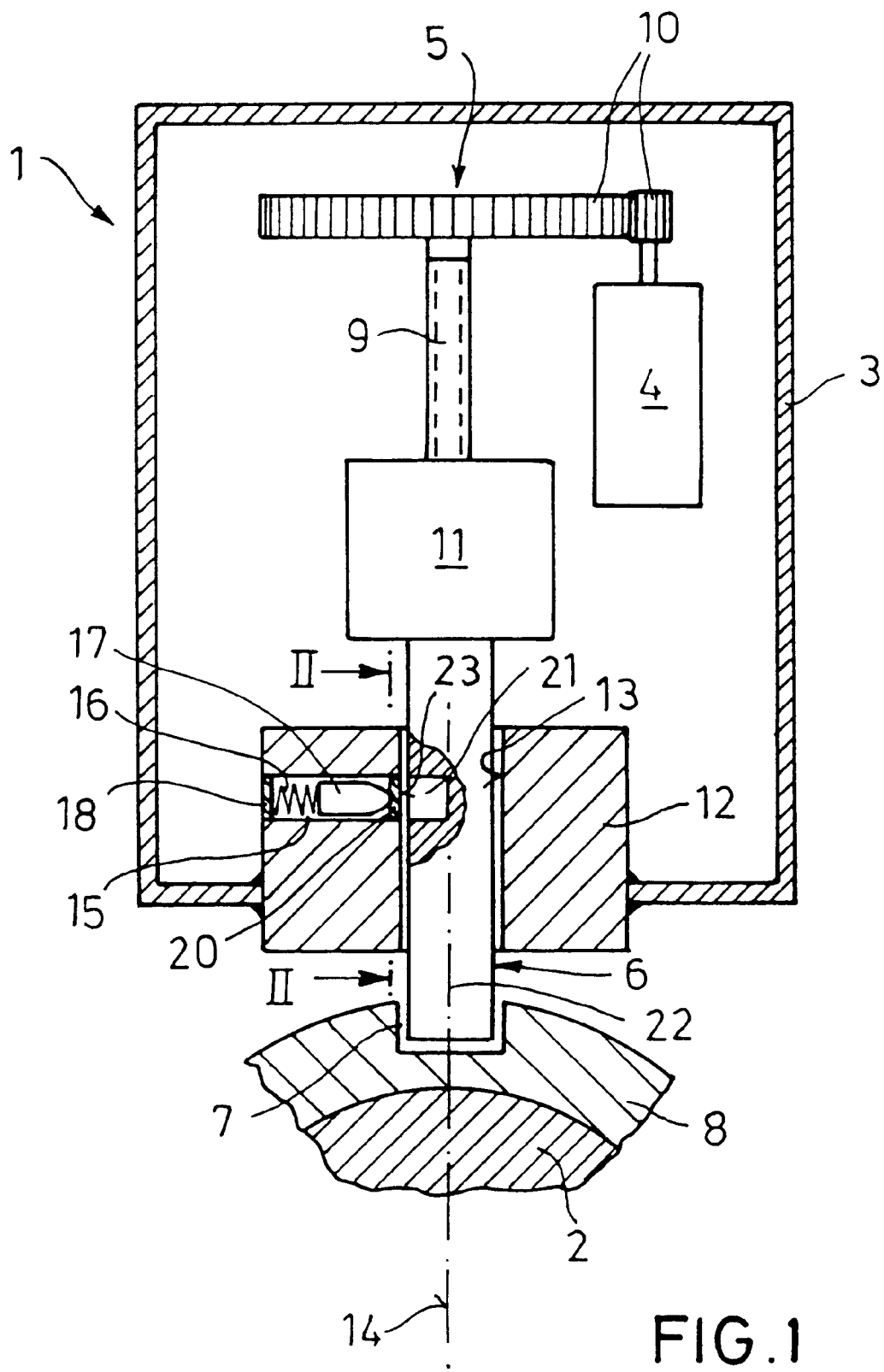
FIG. 1 shows the longitudinal section through a device according to the invention having a blocking pin which can be displaced in a guide part, is located in its locking position and can be secured by a transversely displaceable securing pin.

In FIG. 1, 1 denotes a device according to the invention for the electrical locking of a steering spindle 2 of a motor-vehicle steering gear. The device 1 comprises a housing 3 and an electric motor 4 which is arranged in the housing 3 and has a spindle drive 5 connected downstream, in order to displace a blocking pin 6. In its locking position illustrated in FIG. 1, the blocking pin 6 engages in a groove-shaped recess 7 of a locking ring 8 fastened to the steering spindle 2.

The spindle drive 5 comprises a threaded spindle 9, which is driven by the electric motor 4 via a toothed gear mechanism 10, and a driver 11 which is mounted in a guide and has an internal thread which engages in the thread of the threaded spindle 9.

On its side facing the blocking pin 6, the driver 11 has a socket (not illustrated) via which the blocking pin 6, on its side facing away from the steering spindle 2, is connected, in a manner allowing it to be interchanged, to the driver 11.

In addition, the device 1 for guiding the front part 22 of the blocking pin 6 includes a guide part 12 which can be connected to the housing 3 and the steering gear of the vehicle and via which the device 1 according to the invention can be fastened to the steering gear. The guide part 12 contains a guide recess 13 for the form-fitting guidance of the blocking pin 6, and is designed in such a manner that if the steering spindle 2 is forcibly rotated in the locked state of the blocking pin 6, said guide part absorbs the forces acting upon said blocking pin.

Figure 2:
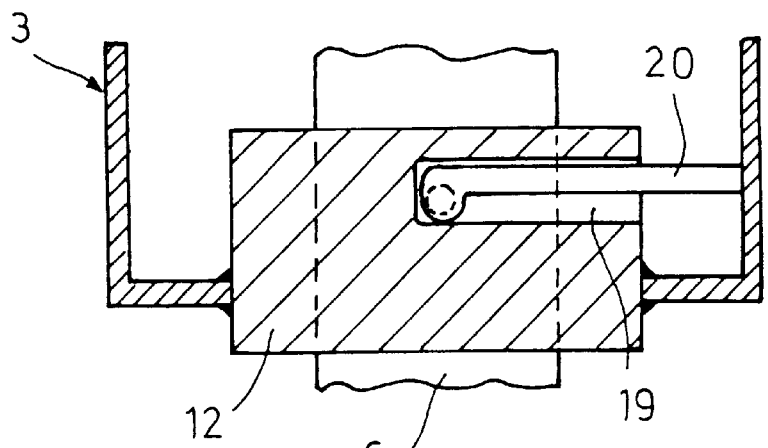
FIG. 2 shows a section along a section line denoted in FIG. 1 by II—II.

A first recess 15 which extends transversely to the longitudinal axis 14 of the blocking pin 6 is provided in the guide part 12, said recess being closed on the outside and opening on the inside into the guide recess 13 via a first opening 23. A securing pin 17 which is acted upon by a compression spring 16 is arranged in a longitudinally displaceable manner in the first recess 15, the compression spring 16 being supported on the outer wall 18 which faces away from the guide recess 13. In the region of the guide recess 13, the first recess 15 is closed by a relatively flat, strip-shaped closure element 20 which is fastened on the inside of the housing 3 and can be displaced in a second recess 19 of the guide part 12 perpendicularly with respect to the first recess 15 (FIG. 2). The securing pin 17 is supported on this closure element 20 against the pressure of the prestressed compression spring 16 (FIG. 1).

In addition, in the blocking pin 6 there is a recess 21 which is adapted to the blocking pin, is aligned with the first recess 15 of the guide part 12 and therefore lies opposite the first opening 23. In the exemplary embodiment, the length of this recess 21 is selected to be shorter than the length of the securing pin 17.

If an unauthorized third party now forcibly opens the housing 3, then along with removal of the corresponding housing wall on which the closure element 20 is located, this element is also removed from the first recess 15 of the guide part 12 and the securing pin 17 is pressed by the compression spring 16 into the recess 21 of the blocking pin 6, with the result that the securing pin 17 is then mounted in a form-fitting manner partially in this recess 21 and partially in the first recess 15 of the guide part 12. The blocking pin 6 and therefore also the steering spindle 2 remain secured in their locking position. Displacement of the blocking pin 6 is not possible without relatively great effort.

The invention is not, of course, restricted to the above-described exemplary embodiment. Thus, the dimensions of the securing pin 17 and of the recess 21 of the blocking pin 6 can be selected in such a manner that after removal of the closure element 20 the securing pin 17 protrudes through the blocking pin 6 and is supported in corresponding recesses of the guide part 12 on both sides of the blocking pin 6.

Figure 3:
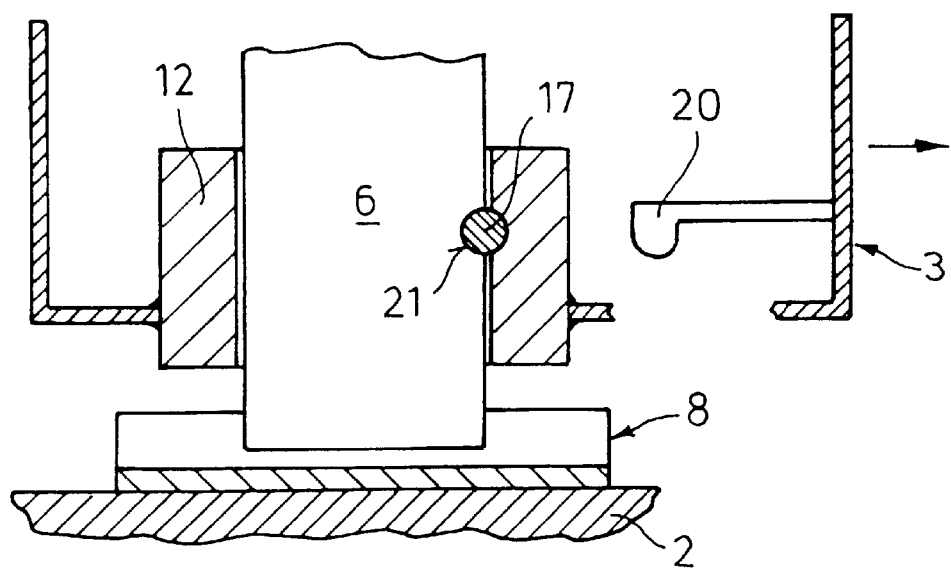
FIG. 3 shows a side view of the blocking pin, which is located in its locking position, of a second device according to the invention, the securing between the blocking pin and guide part taking place by clamping.

It has proven particularly advantageous if the recess of the blocking pin is arranged not in the central region, but at the edge of the blocking pin and is configured in such a manner that once the closure element is removed, the blocking pin is secured by clamping. A corresponding exemplary embodiment is reproduced in FIG. 3, in which the situation of the closure element 20 having been removed is illustrated. In this case, the securing pin which is again denoted by 17 has a circular cross section and the recess, denoted by 21, of the blocking pin 6 has a semicircular cross-sectional contour.

Figure 4:
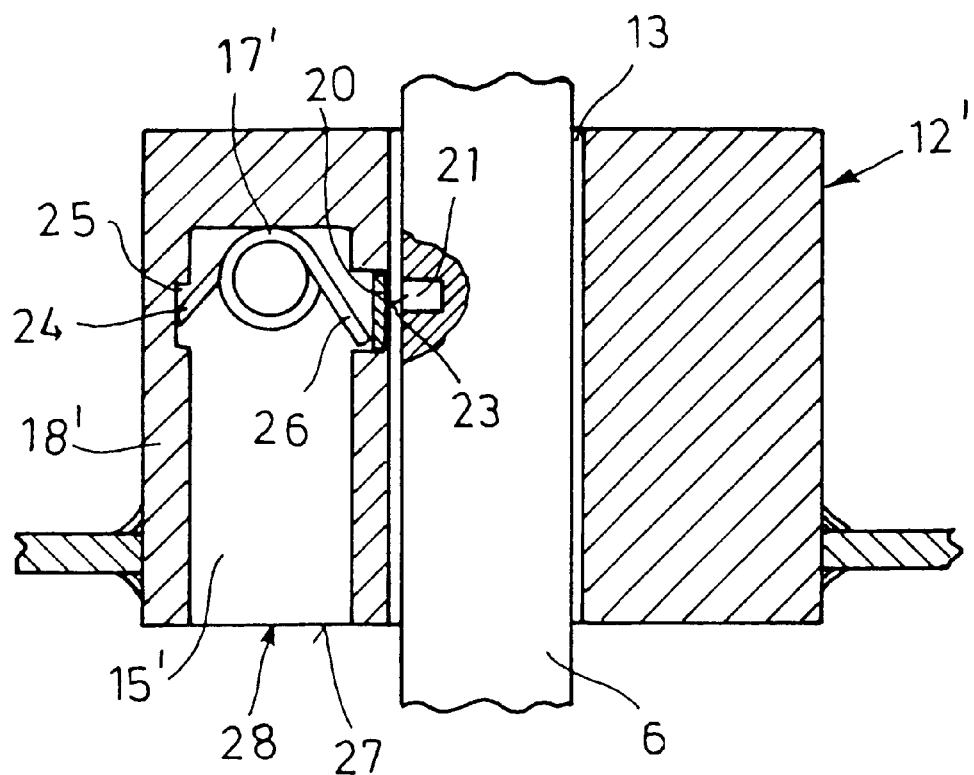
FIG. 4 shows the longitudinal section through a guide part of a further device according to the invention, in which a leg spring is used as the securing element.

Finally, the securing element does not necessarily have to be designed as a pin; however, this element may also be a leg spring which means that a separate spring is not required. A corresponding exemplary embodiment is reproduced in FIG. 4. In this case, 12' denotes a guide part which is again provided with a guide recess 13 for guiding the blocking pin 6.

The guide part 12' has a first recess 15' which extends parallel to the guide recess 13 and has, on its side facing the guide recess 13, a first opening 23 which is closed by a closure element 20. Arranged in the recess 15' is a prestressed leg spring 17' which is supported by its first leg 24 in a depression 25 located in the outer wall 18' of the guide part 12', so that said leg spring 17', once fitted, cannot slip within the first recess 15', for example during vehicle movement. The leg spring 17' is supported by its second leg 26 on the closure element 30.

The first recess 15' has, on its lower end side 27, a second opening 28 through which the leg spring 17' can be pushed in order to fit it in a simple manner into its correct position in the recess 15'.

The functioning of the above-described device having a leg spring corresponds essentially to that having a spring-actuated securing pin. If the closure element 20 is removed or displaced, for example by means of forcible destruction of the housing of the device according to the invention, the leg spring 17' becomes slack and the second leg 26 is pivoted into the recess 21 of the blocking pin 6. Displacement of the blocking pin 6 is then blocked by the leg 26.

List of Reference Numbers

1 Device
2 Steering spindle
3 Housing
4 Electric motor
5 Spindle drive
6 Blocking pin
7 Groove-shaped recess
8 Locking ring
9 Threaded spindle
10 Toothed gear mechanism
11 Driver
12,12' Guide part
13 Guide recess
14 Longitudinal axis
15, 15' First recess (guide part)
16 Compression spring
17 Securing element, securing pin
17' Securing element, leg spring
18,18' Outer wall
19 Second recess (guide part)
20 Closure element
21 Recess (blocking pin)
22 Front part (blocking pin)
23 First opening
24 First leg
25 Depression
26 Second leg
27 End side
28 Second opening

What is claimed is:

1. A device for locking the steering spindle (2) of a steering gear of a vehicle, having a blocking pin (6) which is arranged in a housing (3) and can be displaced from a release position into a locking position and vice versa, having the following features:
   a) on a side facing the steering spindle (2) the device (1) comprises a guide part (12; 12') having a guide recess (13) which is fitted in a form-fitting manner to the blocking pin (6) and in which a front part (22) of the blocking pin (6) is displaceably mounted;
   b) in the guide part (12; 12') a first recess (15; 15') is provided with a first opening (23) which opens into the guide recess (13);
   c) in the blocking pin (6) is a recess (21) which, in the locking position of the blocking pin (6), lies opposite the first opening (23) of the first recess (15; 15') of the guide part (12; 12');
   d) a spring-actuated securing element (17; 17') is arranged in the first recess (15; 15') of the guide part (12; 12');
   e) the first opening (23) of the first recess (15; 15') of the guide part (12; 12') is closed by a closure element (20) which is fastened on the inside of the housing (3), can be displaced in a second recess (19) perpendicularly with respect to the first recess (15; 15') and on which an end of the spring-actuated securing element (17; 17') which faces said closure element is supported, with the result that when the housing region on which the closure element (20) is fastened is removed in the locking position of the blocking pin (6), the securing element (17; 17') is pushed by means of the spring force exerted on the securing element (17; 17') into the recess (21) of the blocking pin (6) and secures the blocking pin (6) in said locking position.

2. The device as claimed in claim 1, wherein the first recess (15) extends transversely to the longitudinal axis (14) of the blocking pin (6) and is closed on the outside, and wherein the securing element (17) is a securing pin that is acted upon by a compression spring (16) and is arranged in a longitudinally displaceable manner in the first recess (15), the compression spring (16) being supported on an outer wall (18) of the first recess (15) which faces away from the guide recess (13).

3. The device as claimed in claim 1, wherein the securing element (17') located in the first recess (15') is a leg spring whose first leg (24) is supported on an outer wall (18') of the first recess (15') which faces away from the guide recess (13) and whose second leg (26) is supported on the displaceable closure element (20).

4. The device as claimed in claim 3, wherein the first recess (15') extends at least partially parallel to the guide recess (13) in the guide part (12') and has, on one of the two end sides (27) of the guide part (12'), a second opening (28), so that the leg spring (17') can be pushed into the first recess (15') through the second opening (28).

5. The device as claimed in claim 4, wherein the first leg (24) of the leg spring (17') is supported in a depression (25) located in the outer wall (18') of the guide part (12').

6. The device as claimed in claim 1, wherein the recess (21) of the blocking pin (6) is arranged on the edge thereof and is configured in such a manner that in the locking position of the blocking pin (6) once the closure element (20) is removed, the blocking pin (6) is secured by clamping.

7. The device as claimed in claim 6, wherein when a securing pin (17) is used as the securing element said securing pin (17) has a circular cross section, and wherein the recess (21) of the blocking pin (6) has a semicircular cross-sectional contour.

8. The device a claimed in claim 1, wherein the closure element (20) is fastened in the region of the housing (3) which faces the vehicle interior.

* * * * *